United States Patent [19]

Tseng et al.

[11] Patent Number: 5,809,188
[45] Date of Patent: Sep. 15, 1998

[54] TUNABLE OPTICAL FILTER OR REFLECTOR

[75] Inventors: Shiao-Min Tseng; Ssu-Pin Ma; Kuang-Yu Hsu; Yinchieh Lai; Kuochou Tai, all of Hsinchu, Taiwan

[73] Assignee: National Science Council, Taipei, Taiwan

[21] Appl. No.: 818,955

[22] Filed: Mar. 14, 1997

[51] Int. Cl.[6] .................................................. G02B 6/34
[52] U.S. Cl. ................... 385/37; 385/30; 385/28; 385/27; 372/102; 372/20; 372/99
[58] Field of Search .................. 385/37, 30, 27, 385/28, 39; 372/20, 99, 102

[56] References Cited

U.S. PATENT DOCUMENTS

| | | | |
|---|---|---|---|
| 4,593,969 | 6/1986 | Goodman et al. | 385/37 |
| 4,881,791 | 11/1989 | Mallinson et al. | 385/37 |
| 4,955,028 | 9/1990 | Alferness et al. | 372/20 |
| 4,986,624 | 1/1991 | Sorin et al. | 385/30 |
| 5,058,977 | 10/1991 | Sorin | 385/30 |

OTHER PUBLICATIONS

Bennion et al., "High–Reflectivity Monomode–Fibre Gration Filters ", Electronics Letters, Mar. 13, 1986 vol. 22, No. 6, pp. 342–343.
Damask, "Practical Design of Side–Coupled Quarter–Wave Shifted Distributed–Bragg Resonant Filters", J. of Lightwave Technology, vol. 14. No. 5, May. 1996, pp 812–821.
Digonnet et al., "Wavelength Multiplexing in Single–mode Fiber Couplers ", Applied Optics, vol. 22, No. 3, Feb. 1, 1983, pp. 484–491.
Haus et al., "Narrow–Band Optical Channel–Dropping Filter ", J. of Lightwave Technology, vol. 10, No. 1 Jan. 1992, pp. 57–61.
Hsu et al., "Surface–Polariton Fiber Polarizer: Design and Experiment ", Jpn. J. Appl. Phys. vol. 36 (1997) pp. L488–L490.
Ma et al., "High–Performance Side–Polished Fibers and Applications as Liquid Crystal Clad Fiber Polarizers " J. of Lightwave Technology, vol. 15, No. 8, Aug. 1997, pp. 1554–1558.
Regdale et al., "Narrowband Fiber Grating Filters", IEEE Journal on Selected Areas in Communications, vol. 8, No. 6, August 1996, pp. 1146–1150.

*Primary Examiner*—Phan T.H. Palmer
*Attorney, Agent, or Firm*—Fish & Richardson P.C.

[57] ABSTRACT

A tunable optical fiber filter or reflector is composed of a single-mode optical fiber having UV-induced fiber gratings in its core region. A planar surface is formed by a mechanical polishing technique such that the planar surface is contiguous to the core region of the optical fiber. The planar surface is covered with a material having a refractive index close to the refractive index of the optical fiber. As the refractive index of the material is changed, the tuning of the reflection or transmission spectra of the optical fiber filter or reflector is attained. The tunable optical fiber filter or reflector is used in optical communication systems, sensing systems, or as external cavities of lasers.

51 Claims, 6 Drawing Sheets

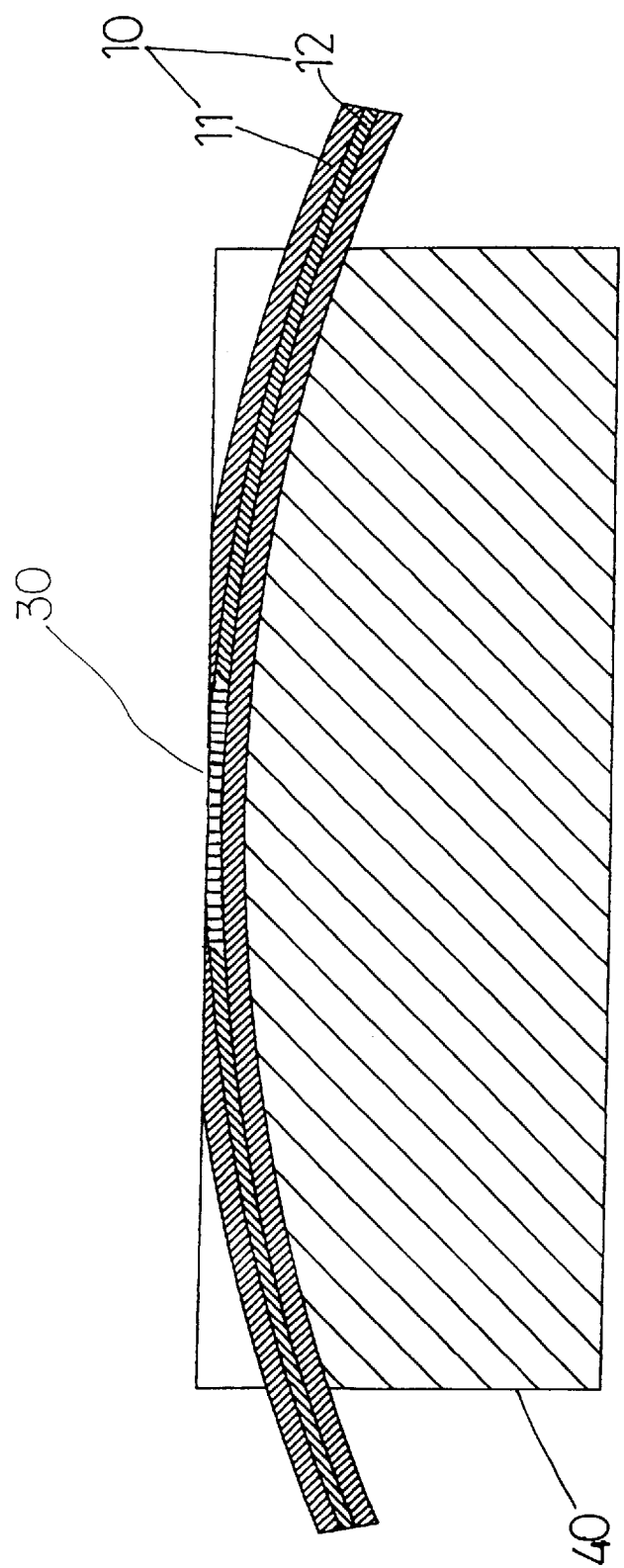

TUNABLE OPTICAL FILTER OR REFLECTOR

FIELD OF THE INVENTION

The present invention relates generally to an optical filter or reflector, and more particularly to a tunable optical fiber filter or reflector.

BACKGROUND OF THE INVENTION

A wavelength reflection phenomenon is brought about when light is transmitted through an optical fiber having Bragg gratings in its core region. If the wavelength of the light is in conformity with the Bragg condition, the transmitted light is reflected in the grating region of the optical fiber. Such an optical fiber as described above is known as an intra-core fiber grating, which is in fact a wavelength filter or wavelength reflector. Fiber gratings can be widely used in the fiber-optic communication system and can be used as fiber sensors, and as reflective mirrors of laser cavities, etc. The applications of the fiber gratings can be significantly broadened if the reflection light spectrum of the fiber gratings is tunable.

The filtering condition of the grating-fibers can be. changed if the length of the Bragg period of the fiber gratings is physically changed. A change in the Bragg period of fiber gratings may be brought about by exerting a tension force on both sides of the grating-fibers, or by winding the grating-fibers around a piezo-electric ceramic modulated by a voltage source, or by altering the temperature of the fiber grating region. Another approach that can be used to attain a change of the filtering condition of the grating-fibers is to change the evanescent field of the guided mode of the grating-fibers. Such an effect is accomplished by changing the magnitude of the effective refractive index of the guided mode. In order to bring about effectively a change in the evanescent field of the guided mode, the perturbation should be as close to the fiber core as possible by making use of the chemical etching method or the polishing technique which is superior to the former method in terms of process control.

SUMMARY OF THE INVENTION

According to the present invention, an optical fiber filter or reflector comprises a single-mode optical fiber which is composed of a core region and a cladding layer in its cross section. In addition, the single-mode optical fiber is composed of one or more composite sections in its longitudinal direction.

The composite section comprises the Bragg gratings located at the core region. The composite section has a planar surface contiguous to the fiber core region of the single-mode optical fiber. The planar surface of the composite section is formed by polishing away a portion of the cladding layer located at one side of the composite section, and a material having a refractive index close to an effective refractive index ($n_{eff0}$) of the fundamental mode of the single-mode optical fiber is applied on the former polished planar surface. As a result, the Bragg condition of the composite section can be changed in accordance with the refractive index of the material.

The present invention further comprises a method of tuning Bragg conditions of an optical fiber filter or reflector, said optical fiber filter or reflector comprising a single-mode optical fiber having a cross section comprising a core region and a cladding layer surrounding said core region such that said cladding layer is in contact with said core region, said single-mode optical fiber further having a composite section in its longitudinal direction; wherein said composite section has Bragg gratings in said core region and has a planar surface formed by stripping portion of said cladding layer at one side of said composite section such that said planar surface is contiguous to said core region, said method comprising the steps of:

(a) coating a first liquid on said planar surface for enabling the Bragg conditions of said composite section to be changed in accordance with the refractive index of said first liquid;

(b) removing said first liquid from said planar surface; and (c) coating a second liquid having a refractive index different from the refractive index of the first liquid on said planar surface, wherein the refractive indexes of said first liquid and said second liquid are close to an effective refractive index ($n_{eff0}$) of the fundamental mode of the single-mode optical fiber.

The present invention still further comprises a method for tuning Bragg conditions of an optical fiber filter or reflector, said optical fiber filter or reflector comprising a single-mode optical fiber having a cross section comprising a core region and a cladding layer surrounding said core region such that said cladding layer is in contact with said core region, said single-mode optical fiber further having a composite section in its longitudinal direction; wherein said composite section has Bragg gratings in said core region and has a planar surface formed by partially polishing portion of said cladding layer at one side of said composite section such that said planar surface is contiguous to said core region, said method comprising the steps of:

(a) coating the planar surface of the composite section with a material having a refractive index subject to change by temperature of the material; and (b) changing the temperature of the material so as to bring about a change in the Bragg conditions of the composite section of the single-mode optical fiber.

It is another objective of the present invention to provide a method for preparing an optical fiber filter or reflector. The method includes the following steps:

(a) forming on a surface of a substrate, such as a silicon, glass and quartz, preferably silicon, an arcuate recess which preferably has a curvature radius ranging between 400 and 2000 centimeters;

(b) locating a single-mode optical fiber, which has a fiber grating section having fiber gratings formed in a core region of said optical fiber, in the arcuate recess of the substrate such that the fiber grating section of the single-mode optical fiber is located at the peak of the arcuate recess, and that a cladding layer surrounding said core region located at said fiber grating section of the single-mode optical fiber is partially exposed from said substrate surface;

(c) stripping the exposed cladding layer so as to form a planar surface at the fiber grating section such that the planar surface is contiguous to said core region of the single-mode optical fiber; and (d) covering the planar surface with a material having a refractive index close to an effective refractive index ($n_{eff0}$) of the fundamental mode of the single-mode optical fiber.

The refractive index of the material located on the planar surface is preferably subject to change by the temperature and is preferably intermediate between the refractive index of the cladding layer and the effective refractive index ($n_{eff0}$) of the guided fundamental mode of the single-mode optical fiber. In other words, the optimum refractive index of the material is the one that is close to the effective index $n_{eff0}$ of the single-mode optical fiber. The material may be a liquid, a $KB_5O_8.4H_2O$ crystal or a liquid crystal, a dielectric material such as $MgF_2$, or other dielectric materials having a refractive index smaller than the $n_{eff0}$ of the single-mode optical fiber.

The Bragg gratings of the single-mode optical fiber of the present invention are preferably photo-induced.

The single-mode optical fiber of the present invention for example is an Er-doped single-mode optical fiber.

The optical fiber filter or reflector of the present invention may further comprises a metal film deposited between the planar surface and the material such that the metal film has a thickness ranging between 6 nm and 30 nm. Accordingly, surface plasmon wave can be effectively excited. The metal film is made of aluminum, nickel, chromium, gold or silver.

According to the present invention, the distance between the planar surface of the optical fiber filter or reflector of the present invention and the interface of the cladding layer and the core region of the fiber grating section is in the range of 0–2 micron or about one wavelength.

The foregoing objectives, features, functions, and advantages of the present invention will be more readily understood upon a thoughtful deliberation of the following detailed description of the embodiments of the present invention in conjunction with the accompanying drawings.

BRIEF DESCRIPTION OF THE DRAWINGS

FIG. 1(a) is a longitudinal sectional view of a single-mode optical fiber of the present invention, which is secured to a V-shaped recess of a polishing substrate.

DETAILED DESCRIPTION OF THE EMBODIMENTS

Figure 1B:
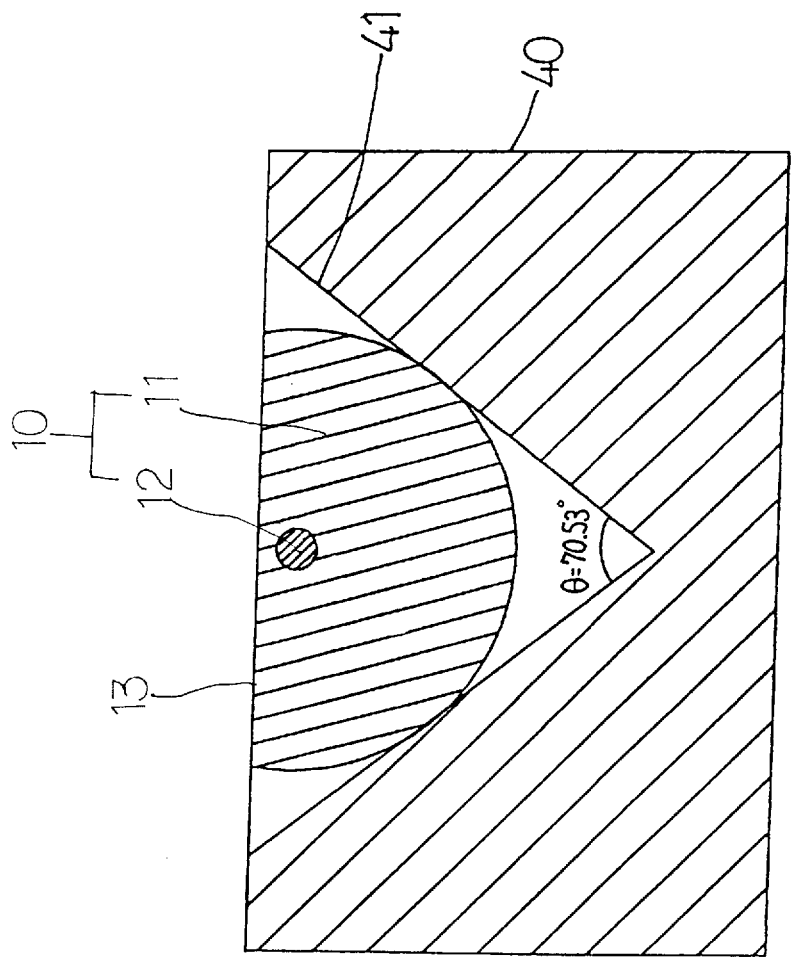
FIG. 1(b) is a cross-sectional view of the single-mode optical fiber of the present invention, which is secured to the V-shaped recess of the polishing substrate and is shown to comprise a side-polished surface contiguous to the core region of the single-mode optical fiber.
Figure 2B:
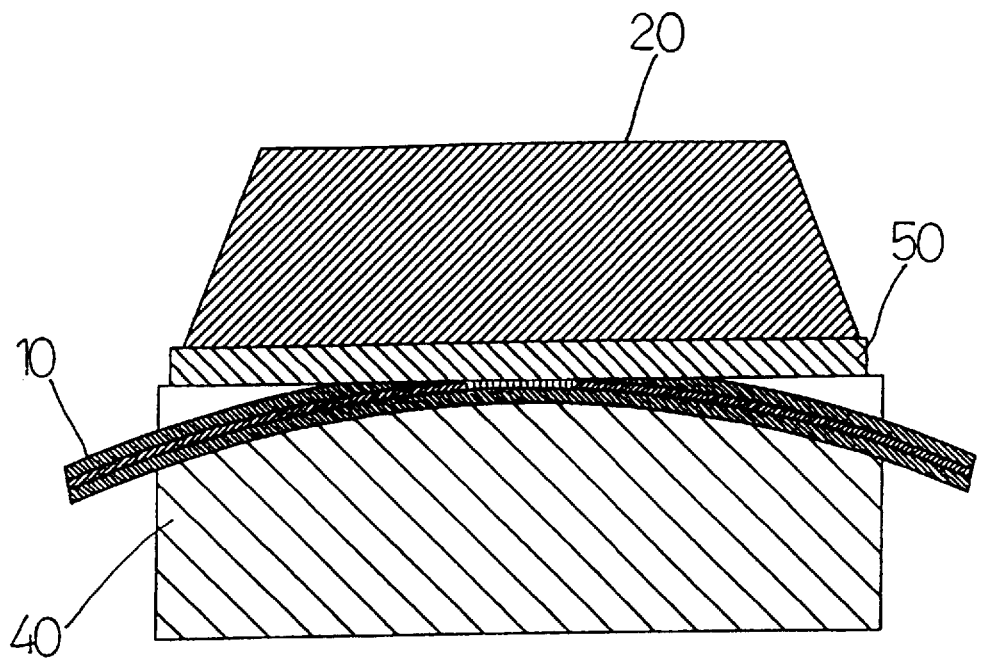
FIG. 2(b) shows a longitudinal sectional view of a tunable optical fiber filter or reflector of a second preferred embodiment of the present invention.
Figure 2A:
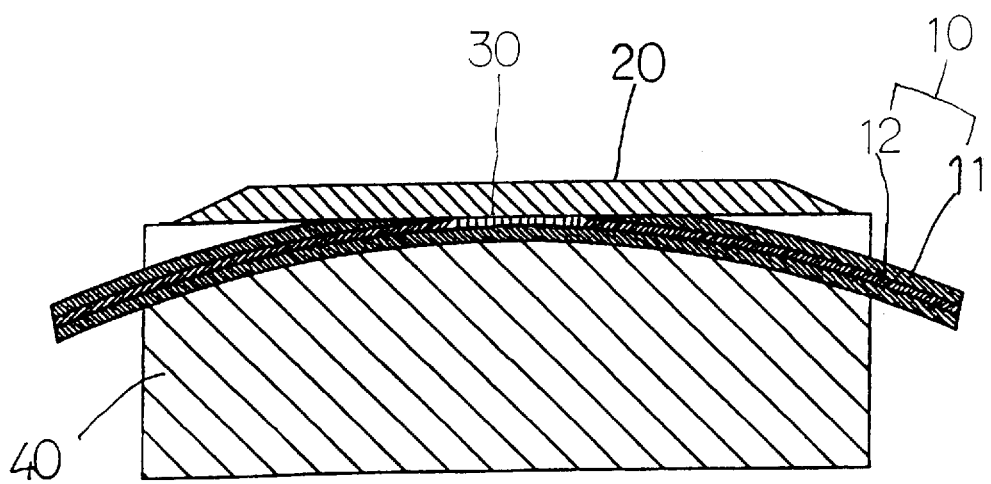
FIG. 2(a) is a longitudinal sectional view of a tunable optical fiber filter or reflector of a first preferred embodiment of the present invention.

As shown in FIGS. 1(a) and 1(b), a UV-induced intra-core grating fiber 10 of the first preferred embodiment of the present invention, which is formed by using an unjacketed single-mode optical fiber, has a cross section which is composed of a core region 12 and a cladding layer 11 enclosing the core region 12. The grating-fiber 10 has a longitudinal section which is composed of a fiber grating region 30. The core region 12 of the fiber grating region 30 has the Bragg gratings. The grating-fiber 10 further comprises a polished surface 13, which is formed by stripping part of the cladding layer 11 located on one side of the fiber grating region 30. The polished surface 13 is contiguous to the core region 12. The tunable optical fiber filter or reflector of the present invention further comprises a material 20 having a refractive index which is close to the refractive index of the fiber. The material 20 is formed on the polished surface 13 of the fiber grating region 30, as shown in FIG. 2(a). The magnitude of the effective refractive index of the guided mode of the optical fiber 10 in the composite, interaction region is dependent on the magnitude of the refractive index of the material coating 20 when the transmitting photo mode passes the fiber grating region 30. As a result, the Bragg condition can be varied so as to enable the optical fiber filter or reflector of the present invention to be tuned. The magnitude of the effective refractive index is evaluated by the following equation:

$$\Delta n_{eff} = n_{eff} - n_{eff0} = \frac{\sqrt{n_{eff0}^2 - n_{cl}^2} - \sqrt{n_{eff0}^2 - n_{ex}^2}}{\sqrt{n_{eff0}^2 - n_{cl}^2} + \sqrt{n_{eff0}^2 - n_{ex}^2}} \cdot \left[\frac{u}{kaVK_1(w)}\right]^2 \cdot \frac{K_0(2wd/a)}{n_{eff0}} \quad (1)$$

In the above equation (1), $n_{eff}$ stands for the effective refractive index of the fiber grating region 30 coated with the material 20; $n_{eff0}$, the effective refractive index of the fundamental mode of the un-polished grating-fiber 10; $n_{ex}$, the refractive index of the material 20; $n_{cl}$, the refractive index of the cladding layer 11; a, the radius of the core region 12; u, the dimensionless transverse propagation constant of the core region 12; w, the dimensionless transverse propagation constant of the cladding layer 11; v, the V-value of the un-polished grating-fiber 10; d, the distance between the center of the core region 12 and the polished surface 13; k, the free-space wave number; and $K_i$, the modified Bessel function of the second kind of order i, i =0,1.

When $n_{ex}$ is equal to $n_{cl}$, $\Delta n_{eff}$ of the above equation (1) is zero, which implies that the optical fiber 10 has the same effect as that of the un-polished fiber. Otherwise, the following circumstances exist.

Figure 3:
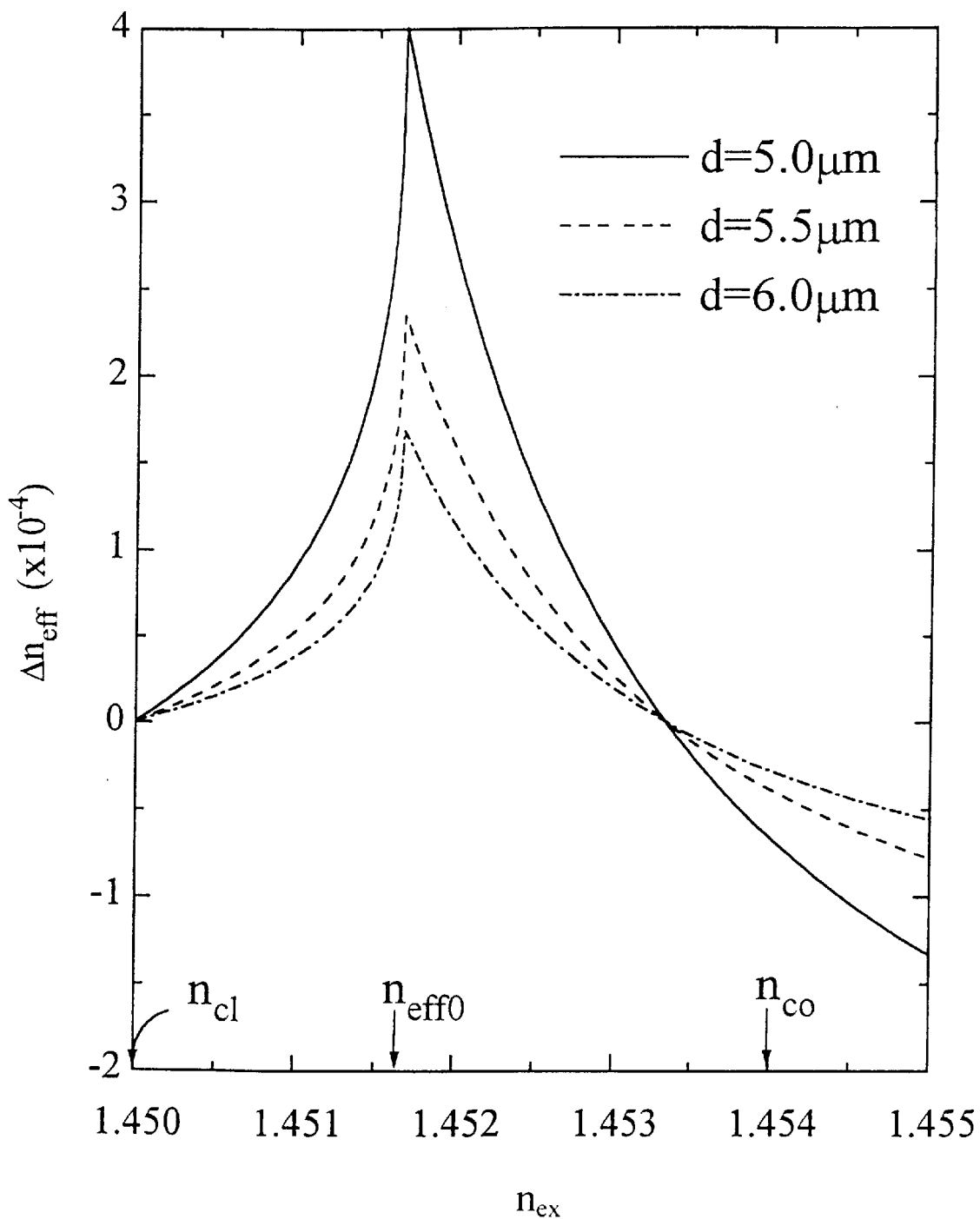
FIG. 3 is a diagram in which the $\Delta n_{eff}=(n_{eff}-n_{eff0})$ are plotted against the refractive indexes ($n_{ex}$) of the material 20 located at the fiber grating section 30 of the tunable optical fiber filter or reflector shown in FIG. 2(a), in which $n_{eff}$ stands for the effective refractive index of the fiber grating region 30 coated with the material 20; $n_{eff0}$, the fundamental effective refractive index of the un-polished optical fiber 10; and d, the distance between the center of the core region 12 and the polished surface 13.

$n_{ex} < n_{cl}$          $\Delta n_{eff} < 0$ $n_{cl} < n_{ex} < n_{eff0}$    $\Rightarrow$   $\Delta n_{eff} > 0$ $n_{ex} > n_{eff0}$          $\Delta n_{eff}$ a complex number As far as the value of $\Delta n_{eff}$ of the above equation (1) listed in FIG. 3, $n_{ex}$=1.454, $n_{cl}$=1.450, a=4.5 $\mu$m, wavelength =1.52$\mu$m. When $n_{ex} > n_{eff0}$, only the real part of $n_{eff}$ is shown in the calculated $\Delta n_{eff}$. As shown in FIG. 3, when $n_{ex}$ is equal to $n_{eff0}$, $\Delta n_{eff}$ has a maximum value. The value of $\Delta n_{eff}$ becomes greater when the distance, d, between the center of the core region 12 and the polished surface 13 becomes smaller. In other words, the value of $\Delta n_{eff}$ is greater under the circumstance that the polished surface 13 gets closer to the core region 12 and that the refractive index $n_{ex}$ of the material 20 is closer to the effective refractive index of the fundamental mode $n_{eff0}$ of the un-side-polished grating-fiber 10 which is not side-polished.

Preferably, the polished surface 13 of the optical fiber 10 is formed by a polishing method in which an arcuate recess 41 is first formed on a silicon wafer 40 serving as a polishing substrate. The optical fiber 10 is then firmly attached in the recess 41 by adhesive. The arcuate recess 41 of the polishing substrate 40 has a depth which corresponds to the (d-a) value about one wavelength. The optical fiber 10 is secured to the arcuate recess 41 such that the protruded cladding layer 11 located on one side of the fiber grating region 30 of the grating-fiber 10 is substantially exposed from the surface of the substrate, and that the cladding layer 11 is mechanically polished until the polishing is extended to reach the proximity of the core region 12, as shown in FIGS. 1(a) and 1(b). Finally, the tunable optical fiber filter or reflector, as shown in FIG. 2(a), of the present invention is formed by sputtering or coating a material 20 on the polished surface. The material 20 has a refractive index close to the refractive index of the grating-fiber 10.

The tunable optical fiber filter or reflector of the present invention may selectively comprise a metal film 50 deposited between the material coating 20 and the polished surface 13. The metal film 50 has a thickness ranging between 6 nm and 30 nm. The metal film 50 is made of aluminum, nickel or chromium by sputtering. The metal film 50 is first formed on the polished surface 13 before the material 20 is deposited on the metal film 50, as illustrated in FIG. 2(b).

Figure 4A:
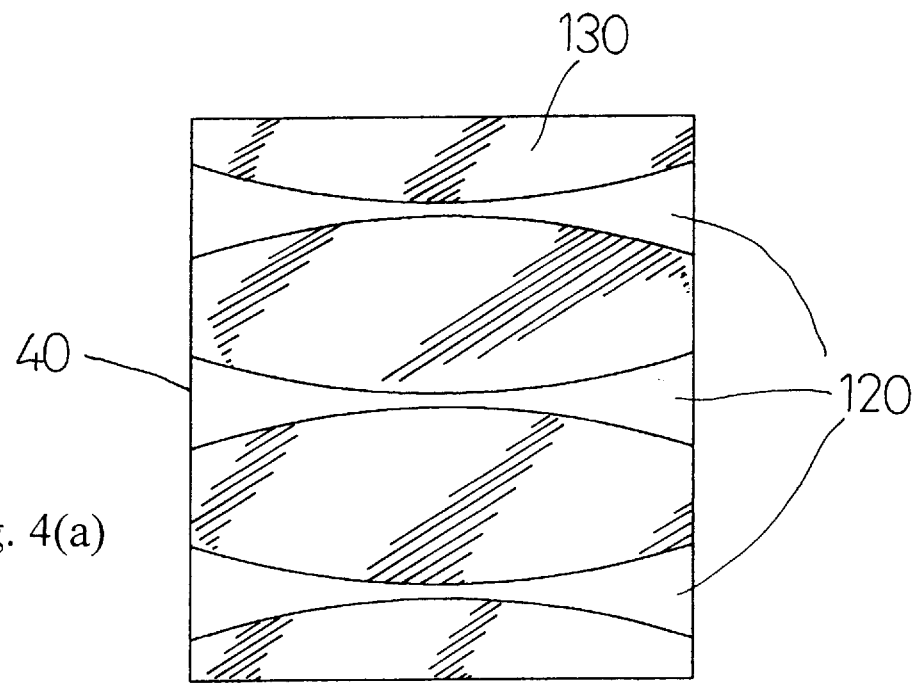
FIG. 4(a) shows a top portional view of a silicon wafer having an etching mask formed by a chemical etching method according to the present invention.
Figure 4B:
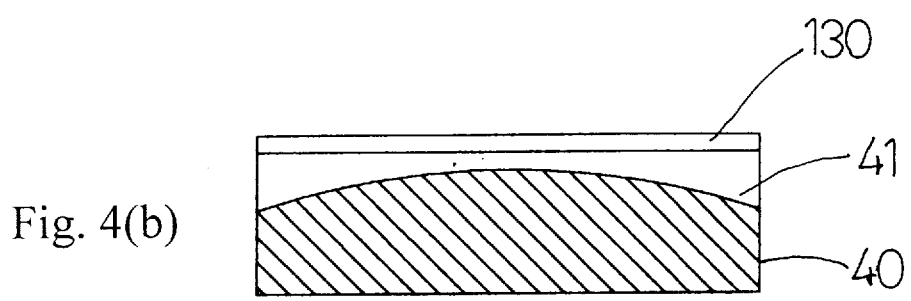
FIG. 4(b) shows a longitudinal sectional view of the silicon wafer as shown in FIG. 4(a).
Figure 4C:
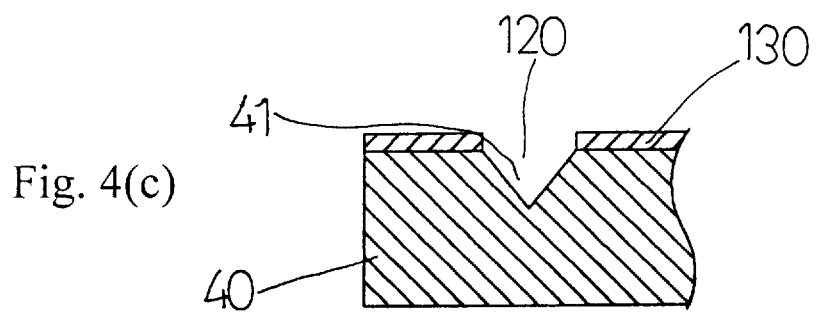
FIG. 4(c) shows a cross-sectional view of the silicon wafer as shown in FIG. 4(a).

The present invention will be more readily understood upon a thoughtful deliberation of the following detailed description of an embodiment of the present invention in conjunction with FIGS. 4(a), 4(b) and 4(c).

A plurality of arcuate recesses were formed in a (100)-oriented silicon wafer by the conventional lithography and the chemical etching techniques used in the microelectronics industry. As illustrated in FIGS. 4(a) and 4(b), an etching mask 130 of silicon dioxide ($SiO_2$) was first formed on the surface of a silicon wafer 40. The etching mask 130 has a plurality of slits 120 which are substantially parallel to one another and are devoid of silicon dioxide stripped therefrom. The slits 120 have a mid-segment which is narrower than both ends of the slits 120. The silicon wafer 40 having the etching mask 130 was etched chemically such that V-shaped recesses 41 having a fixed angle were formed in the silicon wafer 40 which was exposed by the slits 120, as shown in FIG. 4(c). The etching mask 130 was then stripped from the silicon wafer 40. The V-shaped recesses 41 so formed have a curvature radius ranging between 800 cm and 1200 cm.

By using the phase mask approach, the UV-induced fiber gratings were formed in the core region of the 1.5 $\mu$m single-mode optical fiber of standard telecommunication grade. The grating length is one centimeter long. The single-mode fiber was then mounted in each of the V-shaped recesses 41 with optical adhesive. As both ends of the single-mode fiber were pulled in opposite directions, the single-mode fiber was adhered securely to the V-shaped recess such that the fiber grating section of the single-mode fiber was located at the peak of the V-shaped recess 41, and that the cladding layer of the upper side of the fiber grating section was exposed. The exposed cladding layer was then mechanically polished so as to form a smooth side-polished planar surface, which was separated from the core region of the single-mode fiber by a distance smaller than 2 $\mu$m or one wavelength. Tunable fiber gratings were formed on the side-polished planar surface by coating the side-polished planar surface with the Cargille liquid, which is the product of the R. P. Cargille Lab., N.J., U.S.A.

Figure 5:
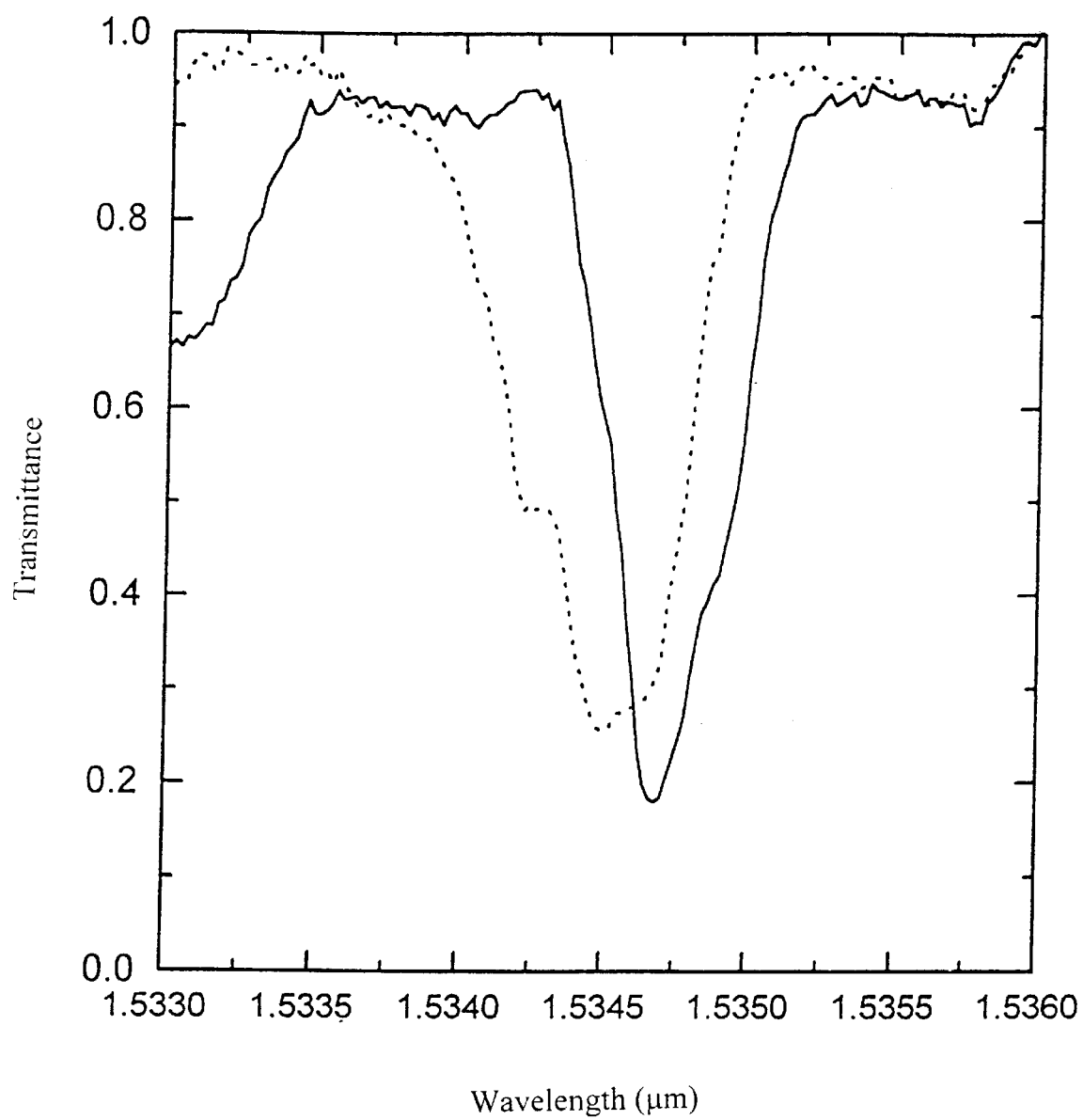
FIG. 5 is a diagram in which the transmission spectra for a polished fiber grating covered by air (the dotted curve) and by an index-matching liquid having the refractive index of 1.456 at sodium D-line (the solid curve).

A broadband light source was then injected into the polished fiber gratings covered by the Cargille liquid. The measured results of the transmission spectra were shown in FIG. 5. The dotted curve in FIG. 5 represents the measured results of the fiber grating covered by the air, whereas the solid curve in FIG. 5 represents the measured results of the fiber grating covered by the Cargille index-matching liquid having the refractive index of 1.456 at room temperature and under the sodium D-line. As shown in FIG. 5, the change of the central reflection wavelength of the polished fiber covered by the Cargille liquid is about 2.4 Å.

The value of the refractive index $n_{ex}$ of the liquid was changed by heating the index-matching liquid and by using different liquids. The results showed that the reflection spectra shifted towards the longer wavelengths as $n_{ex}$ increased from one to $n_{eff0}$.

The inherent advantages of the present invention are expounded explicitly hereinafter.

The induction of fiber gratings by ultraviolet radiation (UV) is a process applicable to the mass production of the tunable optical fiber filter or reflector.

The present invention makes use of the silicon wafer as a polishing substrate so as to control precisely the distance between the core region and the polished surface of an optical fiber.

The polishing method of the present invention is applicable to the mass production of the tunable optical fiber filter or reflector, with the insertion loss being relatively low. The insertion loss per unit interaction length of a polished fiber of the present invention can be one order of magnitude smaller than those of polished fibers embedded in a quartz or fuse silica substrate.

The present invention allows a final small adjustment of the polishing depth, such as 0.4 $\mu$m, to be attained by the buffered HF etching.

The polished fiber of the present invention has a greater effective interaction length (7 mm or more), thereby enabling the tuning range of wavelength to be increased.

The side-polished fiber of the present invention can be covered with the materials having various refractive indexes for achieving a selective filtration or transmission of various wavelengths.

The present invention is economically feasible and technically reliable.

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. An optical fiber filter or reflector comprising a single-mode optical fiber having a cross section comprising a core region and a cladding layer surrounding said core region such that said cladding layer is in contact with said core region, said single-mode optical fiber further having a composite section in its longitudinal direction; wherein said composite section comprises Bragg gratings in said core region and a material having a refractive index close to an effective refractive index ($n_{eff0}$)of the fundamental mode of said single-mode optical fiber, wherein said composite section has a planar surface formed by stripping portion of said cladding layer at one side of said composite section such that said planar surface is contiguous to said core region, and said material is located on said planar surface for enabling the Bragg conditions of said composite section to be changed in accordance with the refractive index of said material.

2. The optical fiber filter or reflector as defined in claim 1, wherein said material is a dielectric.

3. The optical fiber filter or reflector as defined in claim 2, wherein said dielectric is $M_gF_2$ or a dielectric having a refractive index smaller than the effective refractive index ($n_{eff0}$) of the fundamental mode of the single-mode optical fiber.

4. The optical fiber filter or reflector as defined in claim 1, wherein said material and said planar surface are provided therebetween with a metal film having a thickness ranging between 6 nm and 30 nm.

5. The optical fiber filter or reflector as defined in claim 4, wherein said metal film is formed of aluminum, nickel, chromium or silver.

6. The optical fiber filter or reflector as defined in claim 1, further comprising a substrate having an arcuate recess; wherein said single mode optical fiber is located in said arcuate recess.

7. The optical fiber filter or reflector as defined in claim 6, wherein said arcuate recess has a curvature radius ranging between 800 and 1200 centimeters.

8. The optical fiber filter or reflector as defined in claim 1, wherein the Bragg gratings in the core region of the single-mode optical fiber are UV-induced Bragg gratings.

9. The optical fiber filter or reflector as defined in claim 1, wherein said single-mode optical fiber is an Er-doped optical fiber.

10. The optical fiber filter or reflector as defined in claim 1, wherein said material is a crystal of $KB_5O_8 \cdot 4H_2O$ or a liquid crystal.

11. The optical fiber filter or reflector as defined in claim 1, wherein said material is a liquid.

12. The optical fiber filter or reflector as defined in claim 1, wherein said material has a refractive index subject to change by temperature.

13. The optical fiber filter or reflector as defined in claim 1, wherein said material has a refractive index intermediate between the refractive index of the cladding layer and the effective refractive index ($n_{eff0}$) of the fundamental mode of said single-mode optical fiber.

14. The optical fiber filter or reflector as defined in claim 1, wherein said planar surface is separated from an interface of the core region of the fiber grating section and the cladding layer by a distance ranging between 0 and 2 $\mu$m, or about one wavelength.

15. A method of tuning Bragg conditions of an optical fiber filter or reflector, said optical fiber filter or reflector comprising a single-mode optical fiber having a cross section comprising a core region and a cladding layer surrounding said core region such that said cladding layer is in contact with said core region, said single-mode optical fiber further having a composite section in its longitudinal direction; wherein said composite section has Bragg gratings in said core region and has a planar surface formed by stripping portion of said cladding layer at one side of said composite section such that said planar surface is contiguous to said core region, said method comprising the steps of:

(a) coating a first liquid on said planar surface for enabling the Bragg conditions of said composite section to be changed in accordance with the refractive index of said first liquid;

(b) removing said first liquid from said planar surface; and (c) coating a second liquid having a refractive index different from the refractive index of the first liquid on said planar surface, wherein the refractive indexes of said first liquid and said second liquid are close to an effective refractive index ($n_{eff0}$) of the fundamental mode of said single mode optical fiber.

16. The method as defined in claim 15, wherein said single-mode optical fiber is an Er-doped optical fiber.

17. The method as defined in claim 16, wherein said metal film is made of aluminum, nickel, chromium or silver.

18. The method as defined in claim 15, wherein said planar surface is separated from an interface between said core region and said cladding layer by a distance ranging between 0 and 2$\mu$m, or about one wavelength.

19. The method as defined in claim 15, wherein said material and said planar surface are provided therebetween with a metal film having a thickness ranging between 6 nm and 30 nm.

20. The method as defined in claim 15, wherein the refractive index of the first liquid and the refractive index of the second liquid are intermediate between the refractive index of the cladding layer and the effective refractive index ($n_{eff0}$) of the fundamental mode of the single-mode optical fiber.

21. The method as defined in claim 15, wherein the Bragg gratings of the single-mode optical fiber are UV-induced Bragg gratings.

22. A method for tuning Bragg conditions of an optical fiber filter or reflector, said optical fiber filter or reflector comprising a single-mode optical fiber having a cross section comprising a core region and a cladding layer surrounding said core region such that said cladding layer is in contact with said core region, said single-mode optical fiber further having a composite section in its longitudinal direction; wherein said composite section has Bragg gratings in said core region and has a planar surface formed by stripping portion of said cladding layer at one side of said composite section such that said planar surface is contiguous to said core region, said method comprising the steps of:

(a) coating the planar surface of the composite section with a material; and (b) changing the temperature of the material so as to bring about a change in the Bragg conditions of the composite section of the single mode optical fiber.

23. The method as defined in claim 22, wherein said refractive index of said material is intermediate between a refractive index of said cladding layer and the effective refractive index ($n_{eff0}$) of the fundamental mode of said single-mode optical fiber.

24. The method as defined in claim 23, wherein said material is a liquid.

25. The method as defined in claim 22, wherein said planar surface and said material are provided therebetween with a metal film having a thickness ranging between 6 nm and 30 nm.

26. The method as defined in claim 25, wherein said metal film is made of aluminum, nickel, chromium, gold, or silver.

27. The method as defined in claim 22, wherein said material is a dielectric.

28. The method as defined in claim 22, wherein said Bragg gratings of said single-mode optical fiber are UV-induced Bragg gratings.

29. The method as defined in claim 22, wherein said single-mode optical fiber is an Er-doped optical fiber.

30. The method as defined in claim 22, wherein said refractive index of said material is subject to change by temperature.

31. The method as defined in claim 22, wherein said material is a liquid.

32. The method as defined in claim 22, wherein said planar surface is separated from an interface between said core region and said cladding layer of said fiber grating section by a distance ranging between 0 and 2 $\mu$m, or about one wavelength.

33. The method as defined in claim 22, wherein said material is a crystal of $KB_5O_8 \cdot 4H_2O$ or a liquid crystal.

34. A method for preparing an optical fiber filter or reflector, said method comprising the steps of:

(a) forming on a substrate an arcuate recess;

(b) locating a single-mode optical fiber, which has a fiber grating section having fiber gratings formed in a core region of said optical fiber, in the arcuate recess of the substrate such that the fiber grating section of the single-mode optical fiber is located at the peak of the arcuate recess, and that a cladding layer surrounding said core region located at said fiber grating section of the single-mode optical fiber is partially exposed from said arcuate recess;

(c) stripping the exposed cladding layer so as to form a planar surface at the fiber grating section such that the planar surface is contiguous to said core region of the single-mode optical fiber; and (d) covering the planar surface with a material having a refractive index close to an effective refractive index ($n_{eff0}$) of the fundamental mode of said single-mode optical fiber.

35. The method as defined in claim 34, wherein said substrate is made of silicon.

36. The method as defined in claim 35, wherein said arcuate recess is formed on said substrate by the standard microelectronic etching technique.

37. The method as defined in claim 36, wherein said arcuate recess is formed on said substrate by forming on said substrate an etching mask having one or more slits which are substantially parallel to one another and are progressively wider towards both ends thereof from a mid-segment thereof, etching portion of said substrate exposed by said etching mask and removing said etching mask.

38. The method as defined in claim 34, wherein said refractive index of said material is intermediate between refractive index of said cladding layer and the effective refractive index ($n_{eff0}$) of the fundamental mode of said single-mode optical fiber.

39. The method as defined in claim 38, wherein said refractive index of said material is equal to the effective refractive index ($n_{eff0}$) of the fundamental mode of said single-mode optical fiber.

40. The method as defined in claim 34, wherein said material is a dielectric.

41. The method as defined in claim 40, wherein said dielectric is $M_gF_2$.

42. The method as defined in claim 34, wherein said planar surface is first covered with a metal film having a thickness less than 35 nm and is then covered with said material which is deposited on said metal film.

43. The method as defined in claim 42, wherein said metal film is made of aluminum, nickel, chromium, gold, or silver.

44. The method as defined in claim 34, wherein said exposed cladding layer is stripped by a mechanical polishing technique.

45. The method as defined in claim 34, wherein said material is a crystal of $KB_5O_8 \cdot 4H_2O$ or a liquid crystal.

46. The method as defined in claim 34, wherein said arcuate recess has a curvature radius ranging between 400 and 2000 centimeters.

47. The method as defined in claim 34, wherein said planar surface is separated from an interface between said core region and said cladding layer of said fiber grating section by a distance ranging between 0 and 2 $\mu$m, or about one wavelength.

48. The method as defined in claim 34, wherein said material is a liquid.

49. The method as defined in claim 34, wherein the refractive index of the material is subject to change by temperature.

50. The method as defined in claim 34, wherein said fiber gratings are photo-induced Bragg gratings.

51. The method as defined in claim 34, wherein said single-mode optical fiber is an Er-doped optical fiber.

* * * * *